(12) United States Patent
Raudsepp (10) Patent No.: US 10,994,362 B2
(45) Date of Patent: May 4, 2021

(54) TANDEM ARC WELDING HEAD AND A WELDING ARRANGEMENT FOR OVERLAPPING ARCS TO A COLD WIRE ELECTRODE

(75) Inventor: Hannes Raudsepp, Solna (SE)

(73) Assignee: ESAB AB, Gotenborg (SE)

( * ) Notice: Subject to any disclaimer, the term of this patent is extended or adjusted under 35 U.S.C. 154(b) by 892 days.

(21) Appl. No.: 14/366,018

(22) PCT Filed: Dec. 23, 2011

(86) PCT No.: PCT/EP2011/073978
§ 371 (c)(1),
(2), (4) Date: Nov. 20, 2014

(87) PCT Pub. No.: WO2013/091729
PCT Pub. Date: Jun. 27, 2013

(65) Prior Publication Data
US 2015/0336198 A1 Nov. 26, 2015

(51) Int. Cl.
*B23K 9/24* (2006.01)
*B23K 9/14* (2006.01)
(Continued)

(52) U.S. Cl.
CPC ............. *B23K 9/24* (2013.01); *B23K 9/0017* (2013.01); *B23K 9/121* (2013.01); *B23K 9/123* (2013.01);
(Continued)

(58) Field of Classification Search
CPC ...... B23K 9/02; B23K 9/0017; B23K 9/1735; B23K 9/188; B23K 9/1006; B23K 9/1093
See application file for complete search history.

(56) References Cited

U.S. PATENT DOCUMENTS 2,983,808 A * 5/1961 Cresswell ................ B23K 9/14
219/137.44
3,652,823 A * 3/1972 Clemens .............. B23K 9/1336
219/137.7
(Continued)

FOREIGN PATENT DOCUMENTS

AD 2987 A 8/1999
CN 101712095 A 5/2010
(Continued)

OTHER PUBLICATIONS

Development of Advanced 3-Electrode Mag High-Speed Horizontal Fillet Welding Process; XP-001552863; Hiroshi Arita; Tomokazu Morimoto; Shigeo Nagaoka; Toshihiko Nakano; Doc IIW-1877-07 (ex-doc. XII-1896r1-06).
(Continued)

*Primary Examiner* — Christopher M Koehler
*Assistant Examiner* — Spencer H. Kirkwood
(74) *Attorney, Agent, or Firm* — Edell, Shapiro & Finnan, LLC (57) ABSTRACT

An arc electric welding head comprising a first contact device housing a first duct for feeding a first electrode and providing electrical contact between a first power source and said first electrode, a second contact device housing a second duct for feeding a second electrode and providing electrical contact between a second power source and said second electrode, said first and second contact devices being electrically insulated from each other, said first and second ducts being parallel.

20 Claims, 7 Drawing Sheets

(51) Int. Cl.
    *B23K 9/12*           (2006.01)
    *B23K 9/18*           (2006.01)
    *B23K 9/173*         (2006.01)
    *B23K 9/00*           (2006.01)

(52) U.S. Cl.
    CPC .............. *B23K 9/14* (2013.01); *B23K 9/1735* (2013.01); *B23K 9/188* (2013.01)

(56) References Cited

U.S. PATENT DOCUMENTS

| | | | | |
|---|---|---|---|---|
| 3,746,833 | A * | 7/1973 | Ujiie | B23K 9/0213 219/137 R |
| 6,207,929 | B1 * | 3/2001 | Stava | B23K 9/092 219/130.51 |
| 9,132,501 | B2 | 9/2015 | Lennartsson et al. | |

FOREIGN PATENT DOCUMENTS

| | | | |
|---|---|---|---|
| EP | 1894659 A1 | 8/1999 | |
| EP | 1894659 | 3/2008 | |
| JP | 55136571 A * | 10/1980 | |
| JP | 60210370 A * | 10/1985 | ........... B23K 9/1675 |
| JP | 2010082624 | 4/2010 | |
| KR | 20110131215 | 12/2011 | |
| RU | 2365474 C2 | 8/2009 | |
| WO | 2010098700 A1 | 9/2010 | |
| WO | 2010/112068 | 10/2010 | |
| WO | 2010112068 A1 | 10/2010 | |
| WO | WO 2010112068 A1 * | 10/2010 | ............. B23K 9/122 |
| WO | WO-2010112068 A1 * | 10/2010 | ............. B23K 9/188 |
| WO | 2012041375 A1 | 4/2012 | |

OTHER PUBLICATIONS

Notice of Preliminary Rejection for corresponding Korean patent application 10-2014-7020148, with translation dated Apr. 18, 2018, 11 pages.
Office Action for Brazillian Patent Application No. BR112014015383-3 dated Jun. 1, 2018.
KIPO Notice of Preliminary Rejection in corresponding Korean Patent Application No. 10-2019-7013950, dated Jul. 30, 2019, 14 pages.

* cited by examiner

TANDEM ARC WELDING HEAD AND A WELDING ARRANGEMENT FOR OVERLAPPING ARCS TO A COLD WIRE ELECTRODE

CROSS-REFERENCE TO RELATED APPLICATION

This is a national stage application of pending PCT Application No. PCT/EP2011/073978 filed 23 Dec. 2011, by Hannes Raudsepp, titled "An Arc Welding Head and a Welding Arrangement," which is incorporated herein by reference in its entirety.

TECHNICAL FIELD

The present invention relates to a welding head for an arc welding system and to a welding system including a welding head. In particular, the present invention relates to a welding head for tandem welding including a first and a second contact device for enabling connection between a first and a second power source to a first and a second consumable electrode.

BACKGROUND OF THE INVENTION

Tandem welding is a welding technology where two independent electrodes are arranged to perform welding in a common weld puddle.

Each of the two electrodes are connected to a separate power source such that the welding conditions including current and voltage can be controlled independently for the electrodes. The electrodes can be mounted in various settings, such as for instance with the electrodes positioned shifted out in a transverse direction with respect to a welding direction or being positioned at a distance from each other in the welding direction. In the event the electrodes are shifted out in the transverse direction, they may be positioned side by side. This is used for surface welding or specific joints where a wide joint is needed. Side by side welding leads to lower penetration and more width.

Alternatively the electrodes are positioned at a distance from each other in the welding direction. In this event, the first electrode is in the direction of welding is normally referred to as a leading electrode, while the second electrode is normally referred to as a trailing electrode. Normally the leading electrode and the trailing electrodes serve different roles in the welding process. It is for instance known to control the leading electrode such that a desired degree of penetration is obtained, while the trailing electrode controls weld bead appearance, contour and fill.

Tandem welding enables increased deposition rates and therefore improves economy of welding. Tandem welding also enables improved weld quality due to the possibility of assigning the leading and trailing electrode with different tasks. In order to allow the different electrodes to be assigned with different tasks the electrodes should preferably be sufficiently close to enable both electrodes to operate in a common single weld puddle. In the event the electrodes are separated to far from each other, the weld puddle generated by the early electrode may solidify before the second electrode has reached the puddle. In this event, the two electrodes more or less perform the task of two consecutive welding passes.

It is an object of the invention to provide a welding head that enables increased deposition rates, while maintaining a high welding quality.

SUMMARY OF THE INVENTION

This object is achieved by an electric arc welding head according to claim 1. The electric arc welding head according to the invention comprises a first contact device housing a first duct for feeding a first electrode and providing electrical contact between a first power source and said first electrode, a second contact device housing a second duct for feeding a second electrode and providing electrical contact between a second power source and said second electrode. The duct may be closed or be formed as recesses having an open side portion, as long as the ducts serves to secure and guide the electrodes and cold wire.

The electric arc welding device is thus a single integrated welding head housing a first duct and a second duct for two separate electrodes. Hence, the two electrodes may be positioned close to each other. Since the welding head includes two contact devices integrated in a single head, each contact device is electrically insulated from each other. Further the first and second ducts are arranged in parallel. This allows for provision of a controlled electrode distance during varying stick out. Stick out is the distance an electrode protrudes from the contact device before burn off or melting occurs. The first and second ducts being arranged at a distance which allows for arcs between said first and second electrodes and a work piece to be welded will have an overlapping region. That is, the electrodes are so closely arranged such that the arcs from them will have an overlapping region. According to the invention the arc electric welding head further comprises a third insulated duct for feeding a cold wire into said overlapping region. A cold wire is a consumable wire which does not melt by the generation of an arc between the wire and the work piece. A cold wire may however be preheated by a current applied to it. It is however important that no arc is formed by the cold wire. Instead the wire is melted by the heat generated by the other electrodes which are connected to power sources for generation of arcs. It has been shown that by feeding the wire into the overlapping region a controlled melting of the cold wire can be achieved. A controlled melting of the cold wire is essential for the provision of a stable welding process. In the event the melting process is not controlled sufficiently the deposition rate from the cold electrode may vary substantially. Too slow melting may lead to that a solid piece of the electrode is detached from the wire and falls into the weld puddle. There is further a risk for that the wire penetrates into the puddle with a risk of that the wire is pushed to the bottom of the puddle. Such an event will inevitably lead to a great variation in the deposition rate. By feeding the cold wire into an overlapping region, it has been shown that the deposition rate can be held within an acceptable tolerance, such that a stable welding process can be achieved. The use of a cold wire has generated up to 50% increase in deposition rate on tests performed with same diameter on all wires (D2.5 mm) welding with average parameters 850 A 34V. With some parameter settings even up to 70% increase in deposition rate has been achieved.

According to a preferred embodiment the first, second and third ducts are arranged in parallel. By arranging the first, second and third ducts in parallel, a parallel arrangement of the electrodes and the cold wire is guaranteed. A parallel arrangement of the electrodes and the cold wire enables reduced variation in distance between electrode tips or the distance between an electrode tip and the cold wire during variation in stick out from the respective electrode, the variation of the stick out of the cold wire will be reduced accordingly. A variation in electrode stick out as well as a variation in cold wire stick out leads to a variation of the magnitude of the overlapping region in which the cold electrode is introduced. As has been explained above, it is desirable to allow the electrode to melt in the arc plasma in order to obtain a stable deposition rate. A variation in stick out will always be present in any weld process. By arranging the first, second and third ducts in parallel, the variation of the magnitude of the overlapping region will be reduced and the variation of the deposition rate of the cold electrode will likewise be reduced.

Optionally, first and second ducts lie in a first plane and the third duct lies in a second plane which is orthogonal to the first plane. This enables a symmetric position of the cold wire in relation to the first and second electrodes. A symmetric positioning of the cold wire with respect to the electrodes allows for more stable arc plasma conditions at the location of the cold wire. Thus a more stable deposition rate of the cold electrode can be achieved.

Optionally, the first, second and third ducts all lie in a first plane. In this embodiment, the cold electrode is positioned in between the first and second electrode.

Optionally, first and second ducts have different diameters for feeding electrodes having different diameters. By allowing the electrodes to have different diameters, the freedom of controlling the welding process is increased.

Optionally, a distance between a centre of the third and first duct is less than 3 times the diameter of the first duct. Close mounting of the cold wire and first electrode ensures that the cold wire will melt in the arc plasma in a controlled fashion.

Optionally, as an additional requirement, a distance between a centre of the third and second duct is less than 3 times the diameter of the second duct. This mounting ensures that the cold wire will melt in the arc plasma in a controlled fashion.

The welding heads/torches should preferably be connected in a way that makes it impossible for the wire tips to move in relation to each other. This means that he torches should be connected in the lower part of the torch and preferably be located side by side with contact brackets separated only by in insulating body.

Optionally, the first contact device comprises a metallic body in which said first duct is formed, the second contact device comprises a metallic body in which said second duct is formed. Further a body of insulating material is separating said first contact device from said second contact device, wherein said third duct is formed in said body of insulating material. This construction of the welding head allows for a compact and yet rigid structure which allows close mounting of the first and second electrodes and of the cold wire.

Preferably, the first and second contact devices are each abutting on a respective side of said body of insulating material to form an integral body. This construction is particularly compact and rigid.

Optionally, the first and second contact device are clamped together with said body of insulating material to form an essentially cylindrical body, at least in a lower portion of said welding head at which apertures of said first, second and third ducts are located.

BRIEF DESCRIPTION OF DRAWINGS

The invention will be described in further detail below, with reference to appended drawings, where FIG. 2 shows a side view of an embodiment of a welding head according to the invention being arranged to house a cold wire and two fusible continuously fed electrodes, FIG. 3 a side view of another embodiment of a welding head according to the invention being arranged to house a central cold wire, two fusible continuously fed electrodes, and a leading cold electrode.

DETAILED DESCRIPTION OF INVENTION

Figure 1:
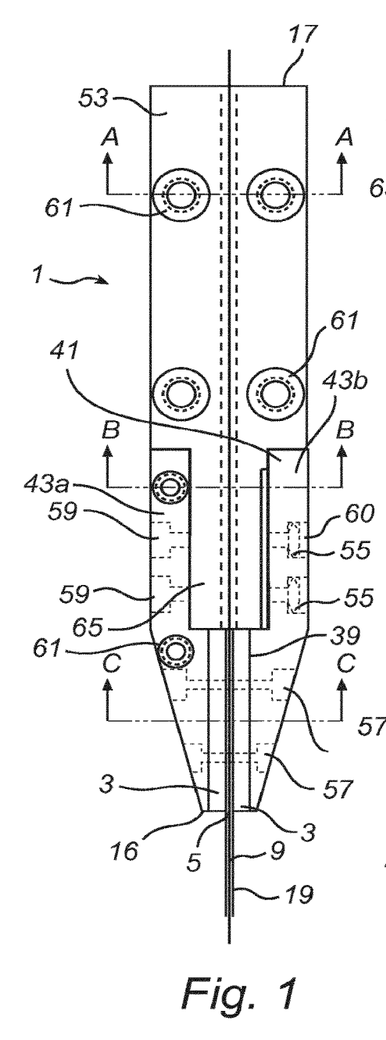
FIG. 1 shows a front view of a welding head according to the invention.

FIG. 1 shows a front view of an arc electric welding head 1. A front view is a view toward the welding head in an direction opposite to a welding direction. The electric arc welding head in FIG. 1 comprises a first contact device 3 housing a first duct 5 for feeding a first electrode 7 and providing electrical contact between a first power source (not shown) and a first electrode 9. As is evident from FIG. 4c a second contact device 11 is positioned behind the first contact device 3. The second contact device 11 is housing a second duct 13 for feeding a second electrode (not shown) and is providing electrical contact between a second power source (not shown) and said second electrode. The first and second contact devices 3, 11 are electrically insulated from each other by an insulating body 15. The insulating body may preferably extend in a length extension of the welding head 1, from a lower end 16 at which an aperture for the cold wire are situated to an upper end 17 at which an opening for entry of the cold wire is situated. The insulating body preferably includes a duct 19 for the cold wire. The duct 19 may be integral with the insulating body 15 or formed in a separate body. Preferably the insulating body 15 is a monolithic body at which the duct 19 is formed. However, the insulating body may be formed from separate pieces integrated to a unit which houses the duct, such as formed by two halves connected to form a duct in between the halves. The first and second ducts 5, 13 are preferably parallel. The duct 19 for the cold wire is preferably parallel with the first and second duct and positioned in between the first and second ducts 5, 13.

The ducts for the electrodes and the duct for the cold wire may have the same diameter to house electrodes and a cold wire having the same diameter, alternatively the electrodes and the cold wire may have different diameters. The electrodes may have the same diameters and the cold wire a different diameter. In particular a following electrode may have a different diameter than a leading electrode. The diameter of the cold wire may be larger than the diameter of the electrodes. The diameters of the electrodes and cold wire are selected to be dependent on for instance, the need for fill, the need for penetration the width of the weld, and the welding speed.

For some embodiments, the cold wire could be shifted in a direction perpendicular to a plane through the electrodes. This is shown in FIG. 4d where the cold wire is positioned in a second plane 23 which is orthogonal to a first plane 21 in which the first and second ducts are positioned. Such an embodiment can be advantageous when having a welding direction as indicated by arrow 25, where the cold wire will be a leading wire and where the first end second electrodes are arranged in parallel and in a plane orthogonal to the welding direction. It would also be advantageous to use such as an electrode lay out when welding in an opposite direction to what is indicated by arrow 25, where the cold wire will be lagging. Preferably the first and second ducts 5, 13 and the duct 19 for the cold wire are all parallel and arranged in a single plane.

However, the ducts may be inclined at a small angle relatively to each other as long as the ducts ends at apertures at the bottom end 16 of the welding head. It is however preferred that the ducts are parallel, since that the electrodes and cold wire will approach a weld puddle in a unidirectional manner, that is all electrodes will be located at the same angle relatively to the puddle. Preferably, the electrodes will be perpendicular to the surface of the puddle. In some embodiments the cold wire and the electrodes may be inclined to a surface normal of the puddle such that the electrode tips points in the forward direction or alternatively such that the electrode tips points in the rearward direction.

The first and the second ducts 5, 13 of the electrode 1 in FIG. 1, are formed in a first and second contact device 3, 11 which are retained in a recess 39 in a retainer 41. The retainer 41 includes a first and a second retainer element 43a, 43b. The first retainer element 43a includes a first part 43a1 having a jaw portion for securing a first contact plate 49a and an attachment portion for securing the first part to a carrier 53. The first part 43a1 may be a monolithic device of conducting material. The first retainer element 43a furthermore includes a second part 43a2 having a jaw portion for securing a second contact plate 49b and an attachment portion for securing the second part to a carrier 53.

The first retainer element 43a has first and second wall portions 45a, 45b facing the first contact device 3. The first and second wall portions 45a, 45b are arranged in abutment with horizontal wall portions 47a, 47b of the first contact device 3.

Likewise, the second retainer element 43b includes a first part 43b1 having a jaw portion for securing a first contact plate 49c and an attachment portion for securing the first part to a carrier 53. The first part 43b1 is a monolithic device of conducting material. The second retainer element 43b furthermore includes a second part 43b2 having a jaw portion for securing a second contact plate 49d and an attachment portion for securing the first part to a carrier 53.

The second retainer element has first wall portion and second wall portions 45c, 45d facing the second contact device 11. The first and second wall portions 45c, 45d are arranged in abutment with horizontal wall portions 47c, 47d of the second contact devices 11.

The first contact device 3 includes a first contact plate 49a, which may be constituted by an essentially rectangular plate having longitudinally extending recess 51a which forms a portion of the duct 5 for the first electrode. The first contact device 3 furthermore includes a second contact plate 49b, which may be constituted by an essentially rectangular plate having longitudinally extending recess 51b which forms a portion of the duct 5 for the first electrode.

In the same manner, the second contact device 11 includes a first contact plate 49c, which may be constituted by an essentially rectangular plate having longitudinally extending recess 51c which forms a portion of the duct 13 for the second electrode. The second contact device 11 furthermore includes a second contact plate 49d, which may be constituted by an essentially rectangular plate having longitudinally extending recess 51d which forms a portion of the duct 13 for the second electrode.

The first and second contact plates of the first and second contact devices may be biased against each other by spring action.

At a front end of the welding head as shown in FIG. 1, the first retainer element 43a, and the first contact device with its first and second contact plates are shown. The first and second contact plates are separated by a gap such that an electrode may be interposed in a space there between and secured in the longitudinally extending recess. The first and second parts of the first retainer device are arranged to be movable in a horizontal direction with respect to each other such that the gap between the first and second contact plates can be made larger or more narrow. Springs 55 are arranged to control a force between the contact plates and a wire electrode positioned in between the contact plates.

The contact plates are secured to a respective first and second part by screws 57. The first part is secured to the carrier 53 by screws 59. The second part is secured to the carrier 53 by screws 60 having resilient means in the form of springs 55 such that the contact plates can be biased against each other.

At a back of the welding head as shown in FIG. 1, the second retainer element 43b, and the second contact device 11 with its first and second contact plates 49c, 49d are located. The first and second contact plates 49c, 49d are separated by a gap such that an electrode may be interposed in a space there between and secured in the longitudinally extending recess. The first and second parts 43b1, 43b2 of the second retainer element 43b are arranged to be movable in a horizontal direction with respect to each other such that the gap between the first and second contact plates 49c, 49d can be made larger or more narrow. Springs are arranged to control a force between the contact plates and a wire electrode positioned in between the contact plates.

The first and second retainer elements 43a, 43b and the first and second contact devices 3, 11 are separated by the insulating body 15 such that on one side of the insulating body 15 are located the first part 43a1 of the first retaining element 43a carrying the first contact plate 49a and the second part 43a2 of the first retaining element 43a carrying the second contact plate 49b, and on the other side are located the first part 43b1 of the second retaining element 43b carrying the first contact plate 49c and the second part 43b2 of the second retaining element 43b carrying the second contact plate 49d. The insulating body includes a duct 19 for the cold wire.

The first and second parts 43a1, 43a2, 43b1, 43b2 of the first and second retaining elements are attached to the carrier 53 at a nose portion 65 of the carrier 53.

Figures 2, 3:
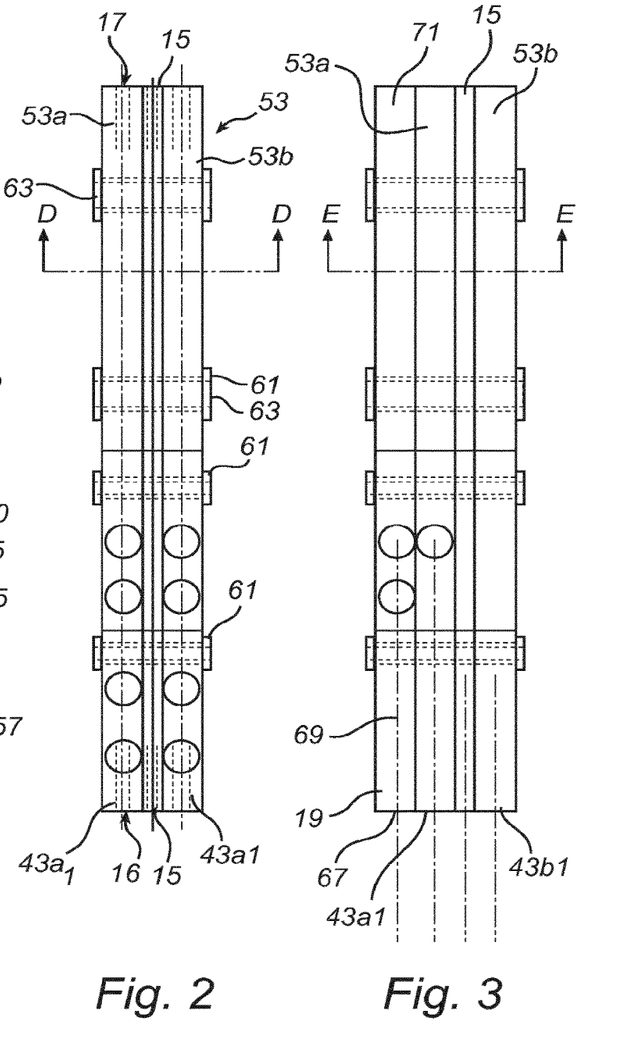

As is evident from FIG. 2 which is a side view of the welding head 1 shown in FIG. 1, an insulating body 15 extends through the welding head 1 to separate the welding head 1 into first and second halves. The first half includes the first retainer element 43a and the first and second contact plates 49a, 49b connected to the first retainer element 43a.

The second half includes the second retainer element 43b and the first and second contact plates 49c, 49d connected to the second retainer element.

The carrier 53 is likewise separated into two halves 53a, 53b which are electrically insulated from each other by the insulating body 15. A single insulating body separating the carrier halves 53a, 53b as well as the first and second retainer elements 43a, 43b, can be used. Alternatively a plurality of insulating bodies can be used to form the insulating layer between the two halves 53a, 53b. The two halves 53a, 53b are connected together by an insulated connection 61. The insulated connection 61 can be formed by a pipe of insulating material. A screw 63 may be extending through the insulating pipe to secure the two halves 53a, 53b and the insulating body 15 together.

The carrier 53 may be formed by a first and a second plate 53a, 53b with an insulating body 15 interposed in between. The first and second plates are secured to each other via insulating elements 61. The insulating elements 61 may be formed by a pipe of insulating material extending through the first and second plates 53a, 53b. A screw 63 extends through the pipe of insulating material.

The carrier 53 may have a nose portion 65. The first and second retainer elements 43a, 43b are attached to the nose portion 65. The first and second retainer elements 43a, 43b are separated by the insulating body 15. The first and second retainer elements 43a, 43b are connected via an insulating element 61. Also this insulating element 61 may be formed by an insulating pipe through which a screw 63 may extend. Preferably insulating washers of insulating material are used to insulate the side walls of the welding head from the screws.

In FIG. 3 a side view of another embodiment of a welding head according to the invention being arranged to house a central cold wire, two fusible continuously fed electrodes, and a leading cold electrode. The welding head in FIG. 3 is based on a welding head as shown in FIGS. 1 and 2 with an additional duct 69 for housing and feeding an additional cold wire. The additional cold wire is formed to be a leading wire by adding a retainer portion 69 having the additional duct 67 for the cold wire and an additional carrier portion 71 which houses a continuation for the additional duct. The additional duct 67 may be formed in a body of insulating material. The body of insulating material may be a monolithic body which may be plate shaped and have a duct extending in a length direction. Alternatively, the duct may be formed as a recess in two plate shape parts forming the insulating body.

A welding head according to the invention may include a first plate element including a first contact device which is connected to a first retainer element. The first retainer element including a first retaining part carrying a first contact plate and a second retaining part carrying a second contact plate. The first and second retaining part being arranged to be movable with respect to each other for adjustment of a gap between said first and second contact plates and being biased towards each other by a resilient means. The welding head may further include a second contact device which is connected to a second retainer element. The second retainer including a first retaining part carrying a first contact plate and a second retaining part carrying a second contact plate, said first and second retaining part being arranged to be movable with respect to each other for adjustment of a gap between said first and second contact plates and being biased towards each other by a resilient means. The first and second retainers being separated by an insulating body housing a duct for a cold wire, and said first and second retainer elements being connected via an insulating element to form an integrated unit.

Further plate elements may be included such as the embodiment shown in FIG. 3, where a plate element of housing a duct for a cold wire integrated in an insulating body is formed. The insulating bodies may have contact devices which provides a clamping force to the cold wire in a similar manner as the contact devices for the electrodes as shown in FIG. 2. Alternatively, the insulating bodies are provided with ducts without clamping means. That is the insulating bodies will not include any moving parts but will be constituted by a monolithic body or a plurality of bodies in which a duct is formed. Such an insulating body may be used to separate two plate elements for housing electrodes.

Hence, more than 2 plate elements and 2 insulating bodies may be used.

Figure 4A:
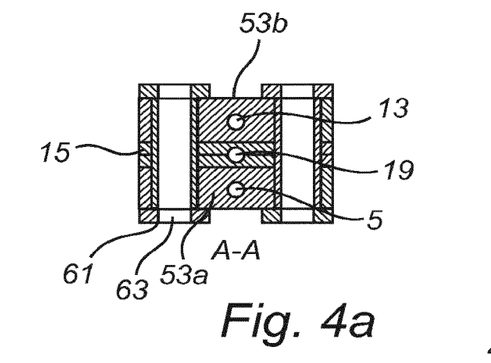
FIGS. 4a-c show cross-sections taken at A-A; B-B; and C-C in FIG. 1.

FIG. 4a shows a cross section taken at A-A in FIG. 1. The figure shows a first and a second plate element 53a, 53b which are separated by an insulating body 15. The first and second plate elements each house a duct for an electrode. The insulating body may be monolithic or be made by two parts where recesses are formed to create a duct 19. The first plate element, the second plate element and the insulating body are united by an insulating member 61.

Figure 4B:
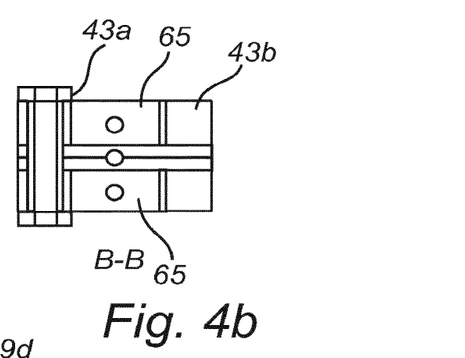
Figure 4C:
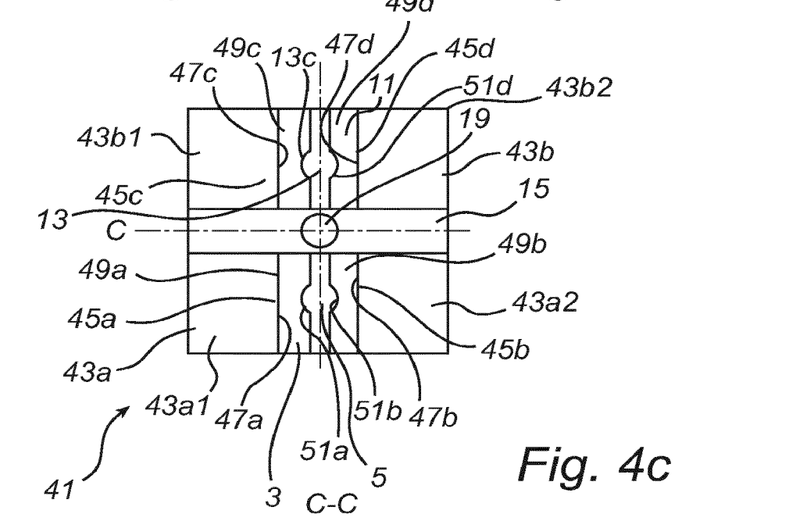
Figure 4D:
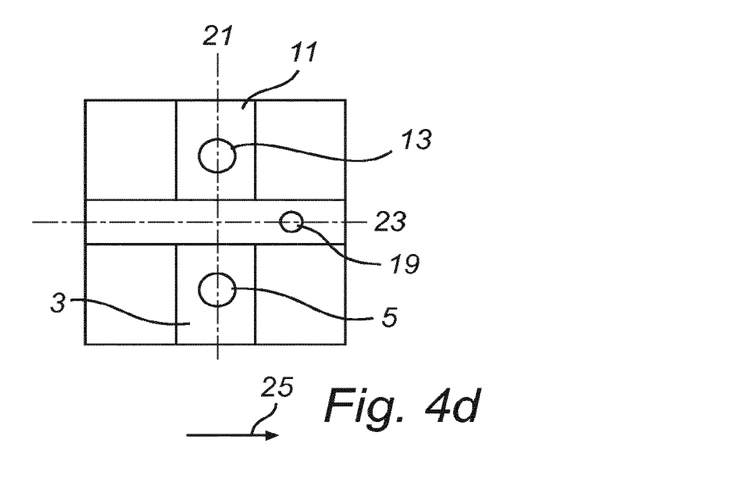
FIG. 4d shows a cross section of an alternative embodiment, where a duct for a cold wire is shifted out from a plane extending through the ducts for the first and second electrodes.

FIG. 4b shows a cross section taken at B-B in FIG. 1. The attachment portions of first and second retainer elements are connected to the nose portions of the first and second retainer elements. The attachment portions and the nose portions are separated by the insulating body 15 such that on one side of the insulating body are located the attachment portion of the first and second retainer parts of first retainer element and the nose portion of the first half of the carrier, and on the other side are located the attachment portion of the first and second retainer parts of second retainer element and the nose portion of the second half of the carrier. The insulating body includes a duct for the cold wire.

Figure 5:
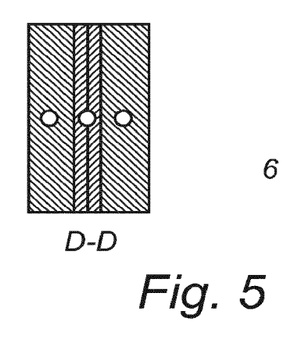
FIG. 5 shows a cross-section taken at D-D in FIG. 2.

In FIG. 5 is shown a cross-section taken at D-D in FIG. 2. Here the first plate element with a first duct for an electrode, the second plate element with a second duct for an electrode and an insulating body are shown.

Figure 6:
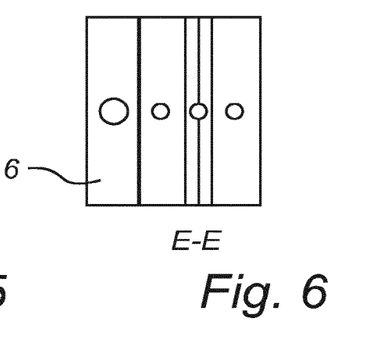
FIG. 6 shows a cross-section taken at E-E in FIG. 3.

In FIG. 6 is shown a cross-section taken at E-E in FIG. 3. The figure includes an additional body of insulating material.

Generally the invention may also be related to an arc electric welding head comprising a first contact device housing a first duct for feeding a first electrode and providing electrical contact between a first power source and said first electrode, a second contact device housing a second duct for feeding a second electrode and providing electrical contact between a second power source and said second electrode, said first and second contact devices being electrically insulated from each other, said first and second ducts being parallel, wherein first contact device is connected to a first retainer element including a first retaining part carrying a first contact plate and a second retaining part carrying a second contact plate, said first and second retaining parts being arranged to be movable with respect to each other for adjustment of a gap between said first and second contact plates and being biased towards each other by a resilient means, said second contact device is connected to a second retainer element including a first retaining part carrying a first contact plate and a second retaining part carrying a second contact plate, said first and second retaining parts being arranged to be movable with respect to each other for adjustment of a gap between said first and second contact plates and being biased towards each other by a resilient means, said first and second retainer being separated by an insulating body housing a duct for a cold wire, and said first and second retainer being connected via an insulating element to form an integrated unit.

Figure 7:
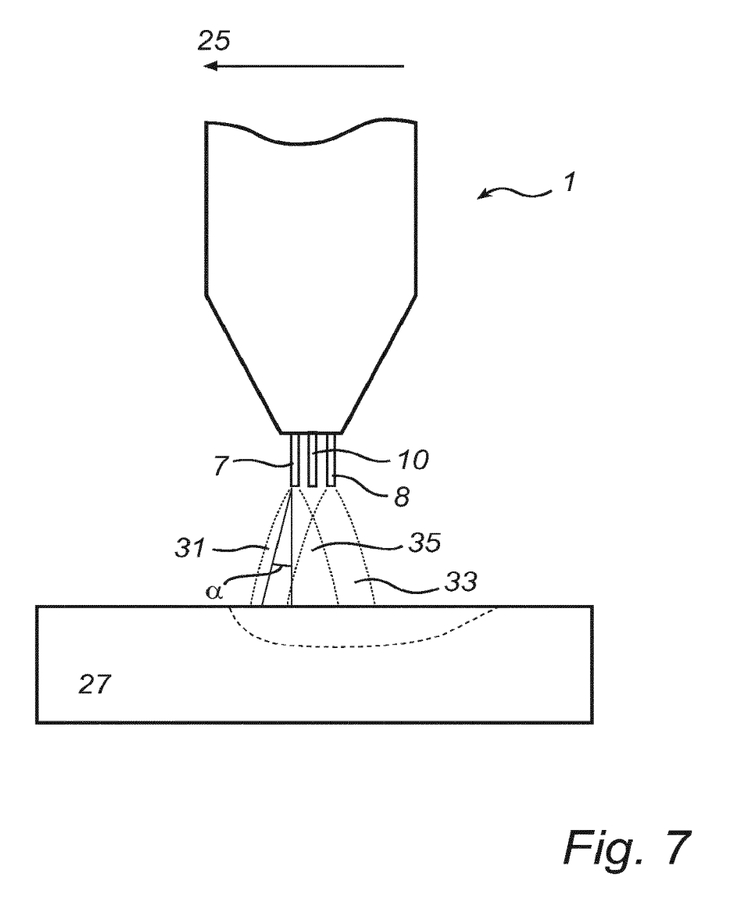
FIG. 7 shows a welding head according to the invention arranged for welding a work piece.

FIG. 7 shows a welding head according to the invention arranged for welding a work piece 27. The welding head 1 propagates in a welding direction as indicated by arrow 25. The first and second electrodes, 7, 8 each have an arc 33. Each of the arcs 31, 33 are formed between the tip of the electrode and the work piece 27.

In arc welding an arc is present between the tip of the electrode and the work piece. The contact point of the arc at the working piece will be moving in a random manner. However, normally it is assumed that the arc is present within a cone shaped or parabolic surface from the tip of the consumable electrode to the work piece. The opening angle of the cone may vary from welding case to welding case. However, a normal opening angle may be around 30°. For this reason it is preferable to locate the cold wire such that it approaches the weld puddle in an essentially orthogonal direction thereto at an axial distance being less than L*cos 15° from the consumable electrodes measured at the tip of the consumable electrode.

It may be preferable to arrange the cold wire in between two consumable wires. The consumable wires may preferably be mounted at an axial distance being less than a cone diameter of the arc measured at the surface of the weld puddle. With this arrangement, the cold wire will be introduced in the outer parts of the arc area defined by the cones of both consumable electrodes, which has shown to be beneficial for the weld result.

In preferable embodiments the feeding arrangement is arranged to feed said cold wire into said weld puddle at an angle of preferably less than 5°, still preferably less than 2° with respect to a surface normal.

In a preferred embodiment the consumable electrodes as well as the cold wire are arranged in parallel and are arranged to be fed toward the weld puddle in an essentially orthogonal direction to a surface of the weld puddle.

Each arc is present within an essentially cone shaped or parabolic surface extending between the electrode tip and the work piece. The cone shaped or parabolic surface defines a plasma region in which the arc plasma will be present when welding. The cone will have an opening angle 2a, which is dependent on the distance between the work piece and the electrode tip and the voltage between the electrode and the work piece. The first and second electrodes 7, 8 are positioned in the vicinity of each other such that an overlapping region 35 between the plasma region of the first electrode and the plasma region of the second electrode. In order to accomplish this the first and second ducts 5, 13 of the welding head 1 are arranged at a distance which allows for arcs between said first and second electrodes and a work piece to be welded will have an overlapping region.

A cold wire 10 is fed into the overlapping region 35.

Figure 8:
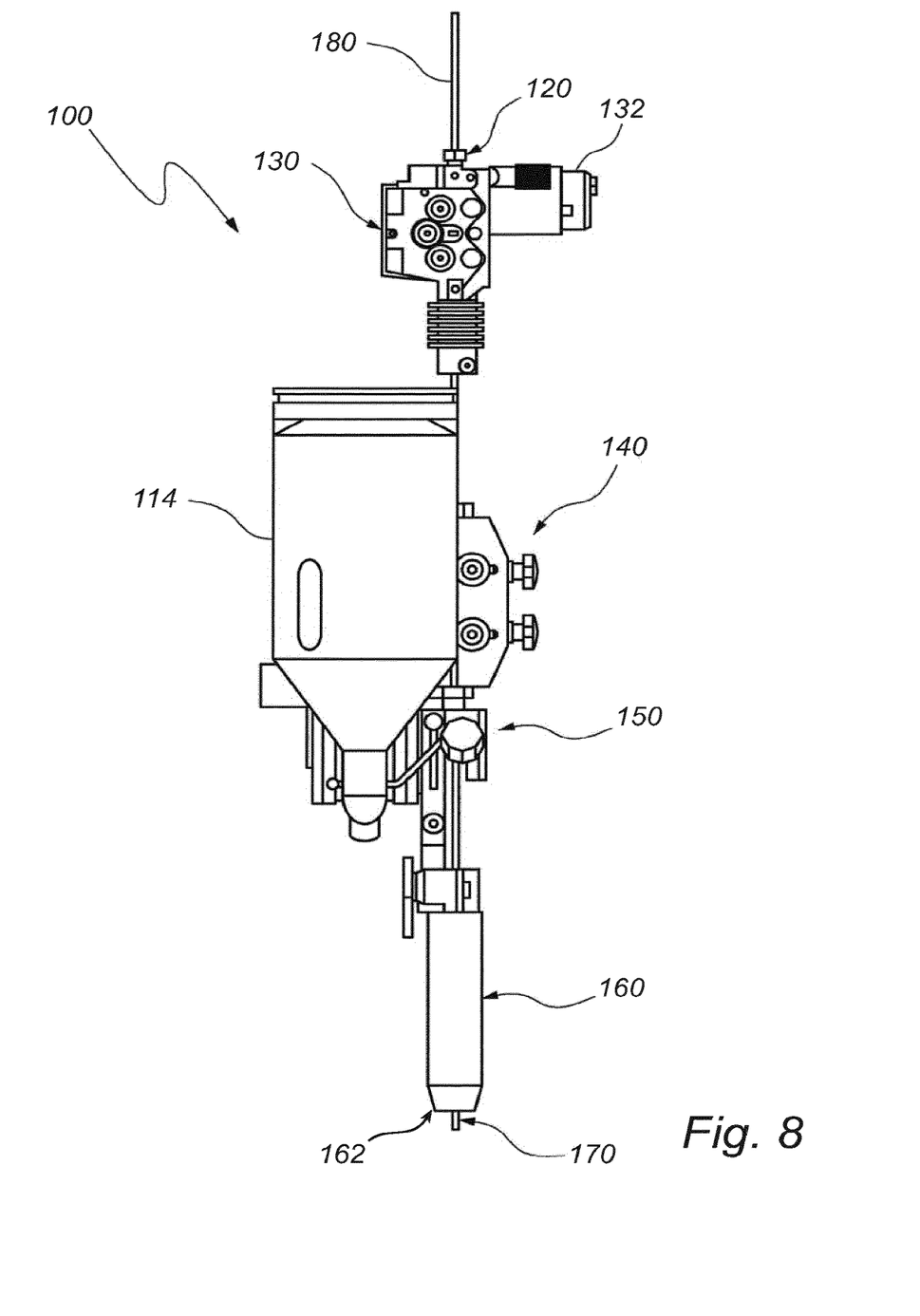
FIG. 8 shows a first view of an example embodiment of an arc-welding welding arrangement for submerged arc welding.
Figure 9:
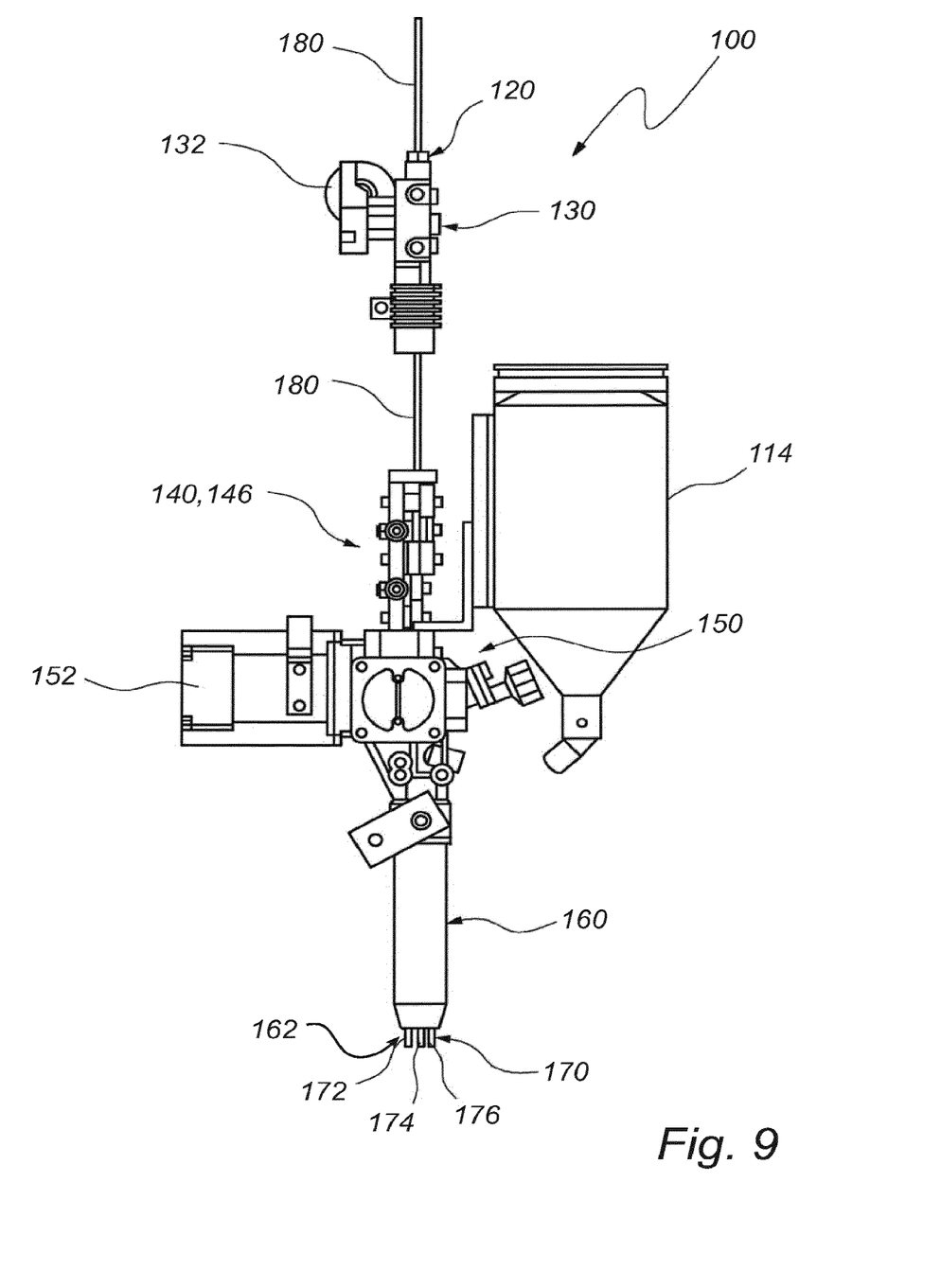
FIG. 9 shows the arc-welding welding arrangement of FIG. 8 turned counterclockwise by 90[deg.]
Figure 10:
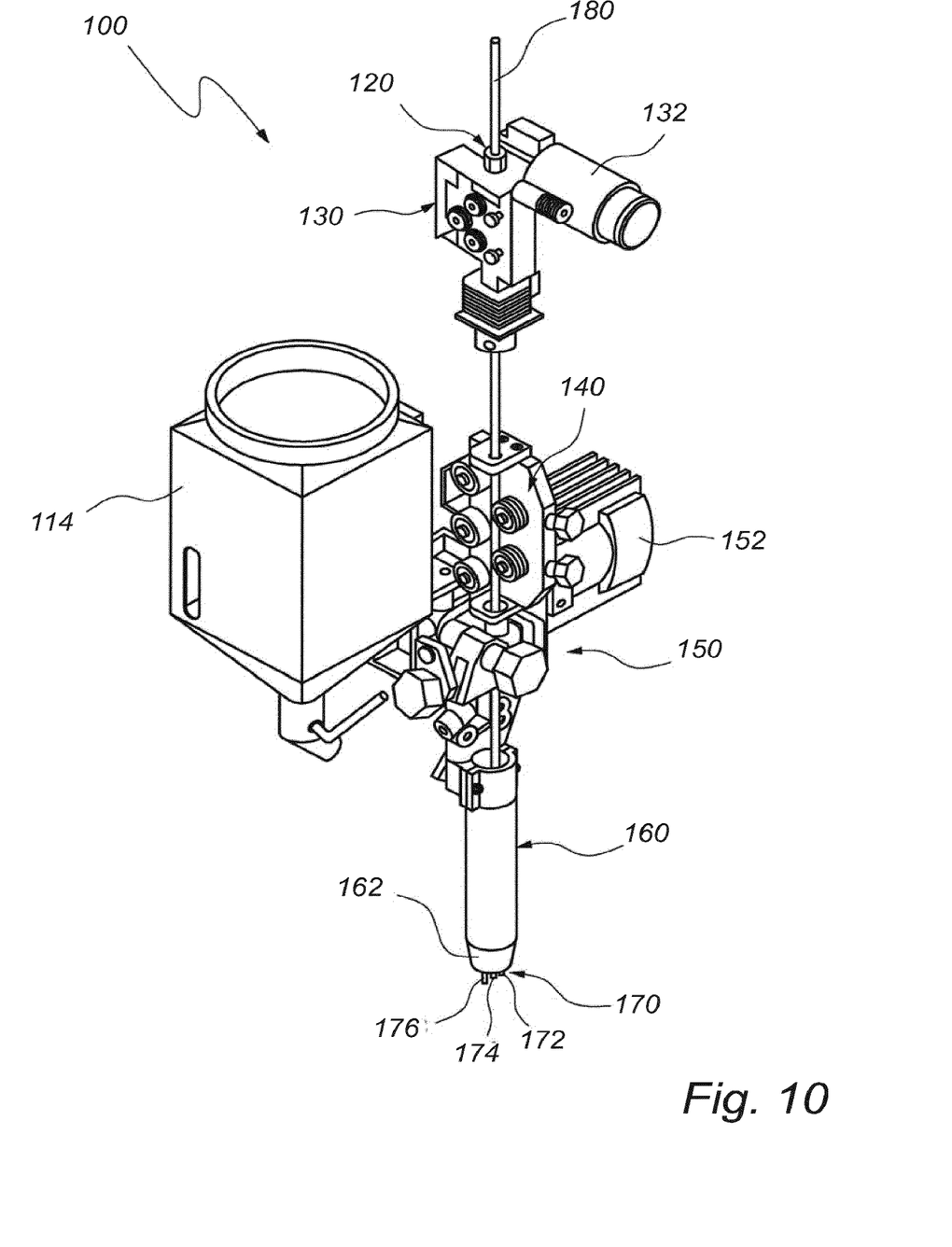
FIG. 10 shows a perspective view or the arc-welding arrangement of FIG. 8, FIG. 11. shows an arc welding system.

In preferred embodiments, in order to enable creation of an overlapping region suitable for receiving the cold wire a distance between a centre of the third and first ducts 19, 5 may be less than 3 times the diameter of the first duct 5. Further, a distance between a centre of the third and second ducts 19, 13 may be less than 3 times the diameter of the second duct FIGS. 8 to 10 depict different views of an example embodiment of an electric arc-welding welding arrangement 100 according to the invention for submerged arc welding which views are described in combination.

Along its longitudinal extension the electric arc-welding welding arrangement 100 comprises an arc welding head 160 at its lower end which during welding is in close proximity to the workpiece to be welded. The arc welding head 160 is of the type as described in connection to FIGS. 1-7 and holds the electrodes 172, 174, 176 (FIGS. 3, 4) of the electrode assembly 170 of the welding arrangement 100. The electrodes 172, 174, 176 exit the arc welding head 160 through outlets 162 at the lower end of the arc welding head 160 which faces the workpiece during the welding operation. The wire electrodes 172, 174, 176 may be fed from respective reservoirs such as coils (not shown) towards the arc welding arrangement 100.

The electrode assembly 170 comprises by way of example two fusible continuously-fed wire electrodes 172, 176 arranged in the arc welding head 160. The continuously fed wire electrodes 172, 176 are electrically isolated from each other by an insulating body in which a duct for a sold wire is situated. The arc welding head 160 comprises an electrically insulating portion 166 for an electrically insulated wire electrode 174.

The electrically insulating body is preferably an extra insulated wire conduit, for instance made of heat resistant material such as ceramics.

Above the arc welding head 160 a feeder device 150 is arranged which feeds an electrode towards the arc welding head 160. Typically, the feeder unit 150 comprises grooved wheels which move the wire electrode or the cold wire towards the arc welding head 160. The feeder unit may be arranged for feeding one of the electrodes or cold wire or both the electrodes and the cold wire. In the event the feeder unit feeds more than a single wire or electrode, the feeder unit 150 will include electrically insulating portions 156 for feeding through each respective electrode and wire such that the electrodes and cold wire are electrically insulated from each other. The electrically insulating portions can consist of feeder wheels with an extra insulated groove for the cold wire 174. The electrodes must also be isolated from each other.

The feeder wheels are driven by a driving unit 152, e.g. an electric motor. Aside from the wire feeder unit 150 a flux hopper 114 is arranged which feeds granular flux to the arc welding head 160 via a nozzle (not shown) for submerged arc welding. Besides the driving unit 152 the wire feeder unit 150 comprises a gear with a drive shaft. On the drive shaft of the gear a feeding wheel 154 is arranged which can be pressurized by another wheel (not shown). The feeding wheel 154 drives the wire electrode forward in the direction of the arc welding head 160.

Above the wire feeder unit 150 a wire straightening unit 140 is arranged for straightening the electrodes and the cold wire. Two rollers (not referred to with reference numbers) depicted in a foremost position of the wire straightening unit 140 are used to exert a pressure on three fixed wheels arranged vertically one over the other in the rear part of the straightening device. The pressure the rollers are exerting on the wheels is adjustable via knobs at the outside of the wire straightening unit 140. The pressure of the rollers on the three wheels is straightening the wire. The wire straightening unit 140 comprises electrically insulating portions which separates the electrodes and the cold wire from each other.

Instead of having a single wire straightening unit 140 for all electrodes and the cold wire, separate wire feeder units can be used for each of the electrodes and the cold wire. In the drawings a separate feeder unit 130 is disposed for feeding the cold wire 174 towards the arc welding head 160. On the wire feeder unit 130 a driving unit 132, e.g. an electric motor, is arranged which drives feeder wheels of the wire feeder unit 130. Besides the driving unit 132, the wire feeder unit 130 comprises a gear with a drive shaft. On the drive shaft of the gear a feeding wheel 134 is arranged which can be pressurized by another wheel (not shown). The feeding wheel 134 drives the wire electrode forward in the direction of the arc welding head 160.

Instead of having a single wire straightening unit, a separate wire straightening unit 120 may be arranged for straightening the individual electrodes or cold wire. Here a single additional straightening unit is shown for simplicity. In such an embodiment, along the longitudinal extension of the welding head 100 an electrically insulating duct 180 is provided for guiding the cold wire 174 from a wire reservoir such as a wire bobbin (not shown) to the contact nozzle. Between the feeder units 150 and 130 and above the wire straightening unit 120 an electrically insulated wire conduit can be arranged which receives the cold wire 174.

Particularly, the electrically insulating duct 180 consists of the electrically insulating portion of the wire straightening unit 140, the electrically insulating portion of the wire feeder unit 150, and the electrically insulated portion 166 of the arc welding head 160 as well as electrically insulated wire conduits between and the units 130, 140, 150, 160 and above the wire straightening unit 120 for the cold wire 174.

Figure 11:
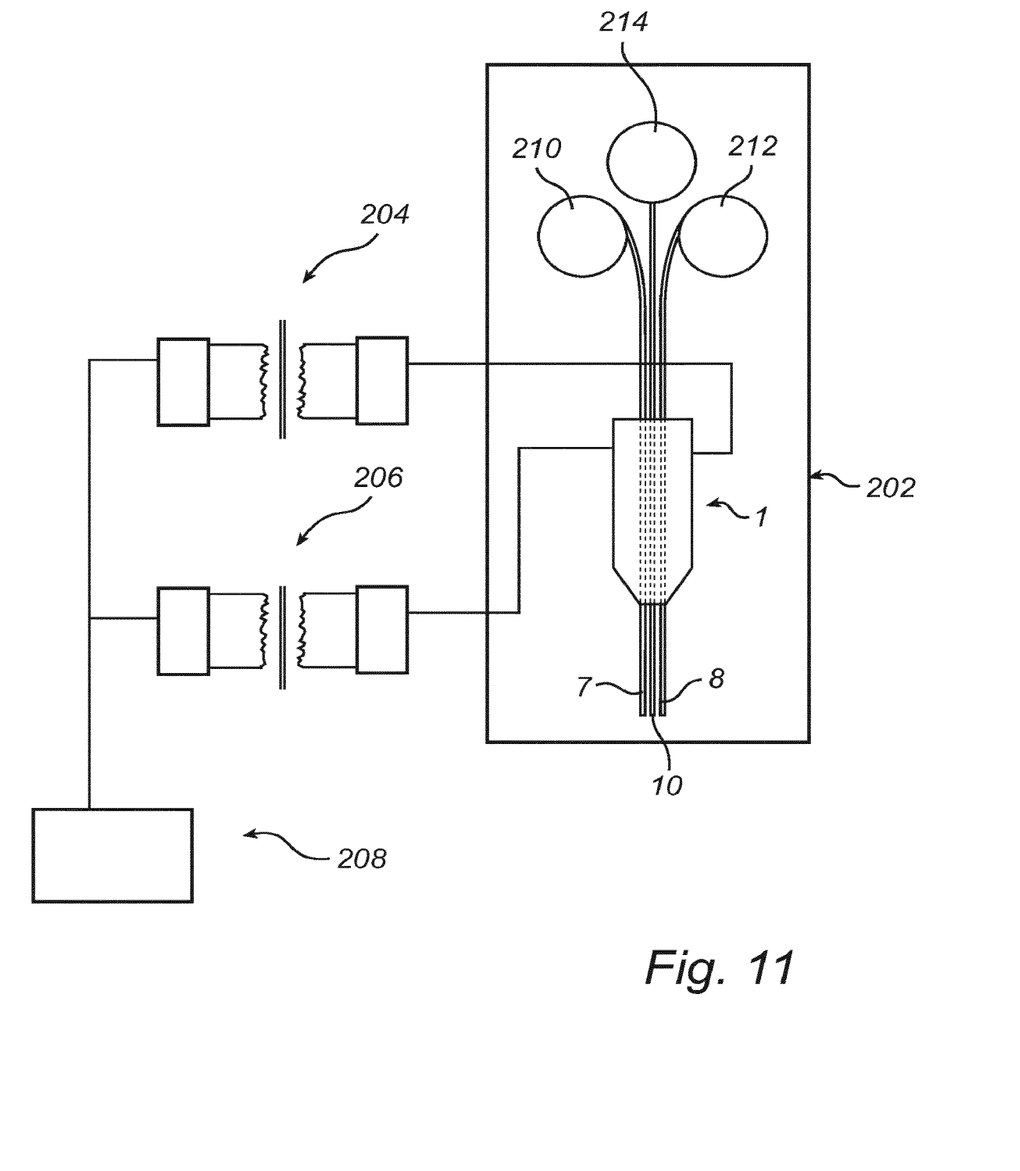

FIG. 11 shows an arc welding system 200 including an arc welding arrangement 202 as shown in FIGS. 8-10. The arc welding arrangement 202 includes an arc welding head 1 as shown in FIGS. 1-7. The arc welding arrangement further includes two separate power sources 204, 206 which are controlled by a controller. The power sources may be of the inverter type, for example such as described in U.S. Pat. No. 6,291,798. The arc welding system includes a first wire feeder 210 for feeding a first consumable electrode 7, a second wire feeder 212 for feeding a second consumable electrode 8, a third feeder 214 for feeding a cold wire 10. The first power source 204 is connected to the first contact device 3 for providing electrical contact between the first power source 204 and the first electrode 7. The second power source 206 is connected to the second contact device 11 for providing electrical contact between the second power source 206 and the second electrode 8.

The invention claimed is:

1. An electric arc welding head comprising:
a first contact device housing a first duct for feeding a first electrode to a weld puddle while providing electrical contact between a first power source and said first electrode; and
a second contact device housing a second duct for feeding a second electrode to the weld puddle while providing electrical contact between a second power source and said second electrode, said first and second contact devices being electrically insulated from each other,
wherein said first and second ducts are parallel to each other and the first duct is separated from the second duct by a first distance which allows a first arc formed between said first electrode and a workpiece on which the weld puddle is formed and a second arc formed between said second electrode and the work piece to have an overlapping region, and
wherein said arc electric welding head further comprises a third insulated duct for feeding a cold wire into said overlapping region, a center of the third duct being separated from a center of the first duct by a second distance that is less than three times a diameter of the first duct and the center of the third duct being separated from a center of the second duct by a third distance that is less than three times a diameter of the second duct so that the first electrode, the second electrode, and the cold wire each operate in the weld puddle.

2. An electric arc welding head according to claim 1, wherein:
said first contact device is connected to a first retainer element including a first retaining part carrying a first contact plate and a second retaining part carrying a second contact plate, said first and second retaining parts being movable with respect to each other so that a dimension of a gap between said first and second contact plates is adjustable,
said second contact device is connected to a second retainer element including a third retaining part carrying a third contact plate and a fourth retaining part carrying a fourth contact plate, said third and fourth retaining parts being movable with respect to each other so that a dimension of a gap between said third and fourth contact plates is adjustable, and
said first and second retainer elements are separated by an insulating body housing a duct for said cold wire, and said first and second retainer elements being connected via an insulated connection to form an integrated unit.

3. An electric arc welding head according to claim 2, wherein said insulated connection is a pipe extending through said first and second retainer elements and said insulating body.

4. An electric arc welding head according to claim 1, wherein said first, second and third ducts are arranged in parallel.

5. An electric arc welding head according to claim 1, wherein said first and second ducts lie in a first plane and said third duct lies in a second plane which is orthogonal to the first plane.

6. An electric arc welding head according to claim 1, wherein said first, second and third ducts all lie in a first plane.

7. An electric arc welding head according to claim 1, wherein said third duct is positioned between said first and second ducts.

8. An electric arc welding head according to claim 1, wherein said first and second ducts have different diameters for feeding respective electrodes having different diameters.

9. An electric arc welding head according to claim 1, wherein said first contact device comprises a metallic body in which said first duct is formed, said second contact device comprises a metallic body in which said second duct is formed, and a body of insulating material separates said first contact device from said second contact device, wherein said third duct is formed in said body of insulating material.

10. An electric arc welding head according to claim 9, wherein said first and second contact devices each abut a respective side of said body of insulating material to form an integral body.

11. An electric arc welding head according to claim 10, wherein said first and second contact devices include a first essentially semi cylindrical envelope surface forming an outer surface of said welding head, a second essentially flat side abutting said body of insulating material, and an end face at which an aperture of said duct is positioned.

12. An electric arc welding head according to claim 10, wherein said first and second contact devices are clamped together with said body of insulating material to form a cylindrical body in a lower portion of said welding head at which apertures of said first, second and third ducts are located.

13. A welding system comprising: a first wire feeder for feeding a first consumable electrode, a second wire feeder for feeding a second consumable electrode, a third wire feeder for feeding a cold wire, a first power source connected to a first contact device for providing electrical contact between said first power source and said first electrode, and a second power source connected to a second contact device for providing electrical contact between said second power source and said second electrode, wherein the welding system further includes a welding head according to claim 1.

14. A welding system comprising:
- a first wire feeder for feeding a first consumable electrode to a weld puddle,
- a second wire feeder for feeding a second consumable electrode to the weld puddle,
- a third wire feeder for feeding a cold wire to the weld puddle,
- a first power source connected to a first contact device housing a first duct and providing electrical contact between said first power source and said first electrode, and
- a second power source connected to a second contact device housing a second duct providing electrical contact between said second power source and said second electrode,
- wherein said first and second contact devices are arranged in an integral welding head so that a first arc formed between said first electrode and a workpiece on which the weld puddle is formed and a second arc formed between said second electrode and the work piece generate an overlapping region, and wherein said welding arrangement further comprises an insulated duct for feeding the cold wire into said overlapping region, a center of the insulated duct being separated from a center of the first contact device by a first distance that is less than three times a diameter of the first duct and the center of the insulated duct being separated from a center of the second duct by a second distance that is less than three times a diameter of the second duct so that the first electrode, the second electrode, and the cold wire each operate in the weld puddle.

15. The welding system of claim 14, wherein the first duct and the second duct lie in a first plane and the insulated duct lies in a second plane which is orthogonal to the first plane.

16. The welding system of claim 14, wherein the first duct, the second duct, and the insulated duct all lie in a first plane.

17. The welding system of claim 14, wherein the insulated duct is positioned between the first duct and the second duct.

18. The welding system of claim 14, wherein the first duct and the second duct have adjustable duct diameters for feeding consumable electrodes of different diameters.

19. The welding system of claim 14, wherein the first contact device comprises a metallic body in which the first duct is formed, the second contact device comprises a metallic body in which the second duct is formed, and the insulated duct is formed in a body of insulating material that separates the first contact device from the second contact device.

20. The welding system of claim 14, wherein the first duct, the second duct, and the insulated duct are arranged in parallel.

* * * * *